United States Patent
Zhang et al.

(10) Patent No.: US 12,136,156 B2
(45) Date of Patent: Nov. 5, 2024

(54) PICTURE PROCESSING METHOD AND APPARATUS, DEVICE, AND STORAGE MEDIUM

(71) Applicant: Beijing Bytedance Network Technology Co., Ltd., Beijing (CN)

(72) Inventors: Shupeng Zhang, Beijing (CN); Yameng Li, Beijing (CN); Yitong Wang, Beijing (CN); Sixue Liu, Beijing (CN); Yuan Tian, Beijing (CN); Jianjun Liao, Beijing (CN); Jie Wen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/090,181

(22) Filed: Dec. 28, 2022

(65) Prior Publication Data
US 2023/0162419 A1 May 25, 2023

Related U.S. Application Data

(63) Continuation of application No. PCT/CN2021/113463, filed on Aug. 19, 2021.

(30) Foreign Application Priority Data

Aug. 19, 2020 (CN) .......................... 202010838589.8

(51) Int. Cl.
*G06T 13/00* (2011.01)
*G06T 3/20* (2006.01)
(Continued)

(52) U.S. Cl.
CPC ................ *G06T 13/00* (2013.01); *G06T 3/20* (2013.01); *G06T 3/40* (2013.01); *G06T 3/60* (2013.01);
(Continued)

(58) Field of Classification Search
CPC ............ G06T 13/00; G06T 7/194; G06T 3/20
See application file for complete search history.

(56) References Cited

U.S. PATENT DOCUMENTS

2008/0129738 A1  6/2008  Kim et al.
2008/0246759 A1* 10/2008  Summers .............. G06F 3/0304
                                                  348/E7.083
(Continued)

FOREIGN PATENT DOCUMENTS

CN    107633228 A    1/2018
CN    108965743 A    12/2018
(Continued)

OTHER PUBLICATIONS

International Search Report issued in International Patent Application No. PCT/CN2021/113463 on Nov. 18, 2021.
(Continued)

*Primary Examiner* — Yi Yang
(74) *Attorney, Agent, or Firm* — Astute IP Law Group

(57) ABSTRACT

A picture processing method and apparatus, a device, and a storage medium are provided. The method comprises: obtaining pictures to be processed, the pictures to be processed comprising a target object segmentation picture and a background completion picture from a same original picture; respectively performing effect processing on the target object segmentation picture and the background completion picture on the basis of a picture type of the target object segmentation picture to obtain respective effect pictures; and synthesizing the respective effect pictures into a rotation animation corresponding to the original picture.

19 Claims, 2 Drawing Sheets

(51) Int. Cl.
*G06T 3/40* (2006.01)
*G06T 3/60* (2006.01)
*G06T 7/194* (2017.01)
*G06T 11/60* (2006.01)

(52) U.S. Cl.
CPC .............. *G06T 7/194* (2017.01); *G06T 11/60* (2013.01); *G06T 2207/20221* (2013.01); *G06T 2210/32* (2013.01)

(56) References Cited

U.S. PATENT DOCUMENTS

| | | | | |
|---|---|---|---|---|
| 2011/0249190 | A1* | 10/2011 | Nguyen | H04N 5/272 348/708 |
| 2012/0087585 | A1* | 4/2012 | Mori | G06T 11/00 382/173 |
| 2013/0229406 | A1* | 9/2013 | Elyada | G06Q 30/02 345/158 |
| 2015/0339523 | A1* | 11/2015 | Tsunematsu | G06T 7/60 382/103 |
| 2017/0011745 | A1* | 1/2017 | Navaratnam | G06F 3/017 |
| 2017/0154450 | A1 | 6/2017 | Wang | |
| 2018/0315176 | A1* | 11/2018 | Sharma | G06T 5/50 |
| 2018/0367752 | A1* | 12/2018 | Donsbach | G06F 18/22 |
| 2020/0082542 | A1* | 3/2020 | Zhu | G06T 7/11 |
| 2020/0258313 | A1 | 8/2020 | Chen et al. | |

FOREIGN PATENT DOCUMENTS

| | | |
|---|---|---|
| CN | 109840881 A | 6/2019 |
| CN | 109996107 A | 7/2019 |
| CN | 110288614 A | 9/2019 |
| CN | 112037121 A | 12/2020 |
| EP | 2980758 A2 | 2/2016 |
| JP | 2012134775 A | 7/2012 |
| JP | 5825542 B1 | 12/2015 |
| JP | 2015219879 A | 12/2015 |
| JP | 2020513123 A | 4/2020 |

OTHER PUBLICATIONS

Office Action in CN202010838589.8, mailed Jul. 19, 2023, 6 pages.
Extended European Search Report in EP21857726.0, mailed Nov. 7, 2023, 7 pages.
Office Action in JP2023-504566, mailed Jan. 30, 2024, 6 pages.
Office Action for Japanese Patent Application No. 2023-504566, mailed Jul. 23, 2024, 11 pages.

* cited by examiner

PICTURE PROCESSING METHOD AND APPARATUS, DEVICE, AND STORAGE MEDIUM

This application is a continuation application of International Application No. PCT/CN2021/113463, filed on Aug. 19, 2021, which claims the priority to Chinese Patent Application No. 202010838589.8 titled "PICTURE PROCESSING METHOD AND APPARATUS, DEVICE, AND STORAGE MEDIUM", filed on Aug. 19, 2020 with the China National Intellectual Property Administration, both of which are incorporated herein by reference in their entireties.

FIELD

The present disclosure relates to the field of data processing, and in particular, to a picture processing method and apparatus, a device, and a storage medium.

BACKGROUND

With the continuous development of picture processing technology, users' requirements for displaying effects of pictures are more and more diversified.

For a picture containing a target object, such as a portrait picture, how to display the picture to the users in a stereoscopic and dynamic form is one of the requirements for displaying effects of pictures.

Therefore, how to meet the above requirements for displaying the effects of pictures is a technical problem that needs to be solved urgently at present.

SUMMARY

In order to solve the above technical problems or at least partially solve the above technical problems, the present disclosure provides a picture processing method, an apparatus, a device and a storage medium, which can display pictures to users in a stereoscopic and dynamic form to meet the user's requirements for displaying the effects of pictures.

In a first aspect, a picture processing method is provided in the present disclosure. The method includes:
  obtaining pictures to be processed, the pictures to be processed including a target object segmentation picture and a background completion picture from a same original picture;
  performing effect processing on the target object segmentation picture and the background completion picture separately, according to a picture type of the target object segmentation picture, to obtain an effect picture corresponding to the target object segmentation picture and an effect picture corresponding to the background completion picture; and
  synthesizing the effect picture corresponding to the target object segmentation picture and the effect picture corresponding to the background completion picture to generate an effect video corresponding to the original picture.

In an embodiment of the present disclosure, the performing effect processing on the target object segmentation picture and the background completion picture separately, according to a picture type of the target object segmentation picture, to obtain an effect picture corresponding to the target object segmentation picture and an effect picture corresponding to the background completion picture includes:
  if the picture type of the target object segmentation picture is a full body picture,
  translating and enlarging the target object segmentation picture according to a preset first direction to obtain the effect picture corresponding to the target object segmentation picture, the preset first direction being rightward or leftward; and
  rotating a perspective view of the background completion picture according to a preset second direction to obtain the effect picture corresponding to the background completion picture, the preset second direction being leftward or rightward, and the preset first direction being different from the preset second direction.

In an embodiment of the present disclosure, the performing effect processing on the target object segmentation picture and the background completion picture separately, according to a picture type of the target object segmentation picture, to obtain an effect picture corresponding to the target object segmentation picture and an effect picture corresponding to the background completion picture includes:
  if the picture type of the target object segmentation picture is a half body picture,
  enlarging the target object segmentation picture according to a forward direction to obtain the effect picture corresponding to the target object segmentation picture; and
  rotating a perspective view of the background completion picture to realize an effect of a front leaning a preset angle to obtain the effect picture corresponding to the background completion picture.

In an embodiment of the present disclosure, the synthesizing the effect picture corresponding to the target object segmentation picture and the effect picture corresponding to the background completion picture to generate the effect video corresponding to the original picture includes:
  synthesizing the effect picture corresponding to the target object segmentation picture and the effect picture corresponding to the background completion picture to generate a rotating animation corresponding to the original picture.

In an embodiment of the present disclosure, the synthesizing the effect picture corresponding to the target object segmentation picture and the effect picture corresponding to the background completion picture to generate the rotating animation corresponding to the original picture includes:
  if the picture type of the target object segmentation picture is the half body picture,
  determining a connection point between a target object in the effect picture corresponding to the target object segmentation picture and the effect picture corresponding to the background completion picture; and
  synthesizing the effect picture corresponding to the target object segmentation picture and the effect picture corresponding to the background completion picture to generate the rotating animation corresponding to the original picture based on the connection point.

In an embodiment of the present disclosure, the target object segmentation picture includes a portrait segmentation picture.

In an embodiment of the present disclosure, after the synthesizing the effect picture corresponding to the target object segmentation picture and the effect picture corresponding to the background completion picture to generate the effect video corresponding to the original picture, the method further includes:

generating an album from effect videos corresponding to a plurality of original pictures.

In an embodiment of the present disclosure, before the performing effect processing on the target object segmentation picture and the background completion picture separately, according to a picture type of the target object segmentation picture, to obtain an effect picture corresponding to the target object segmentation picture and an effect picture corresponding to the background completion picture, the method further includes:

determining whether a target object in the target object segmentation picture includes a half body object;

determining that the picture type of the target object segmentation picture is a half body picture if the target object in the target object segmentation picture includes a half body object;

and determining that the picture type of the target object segmentation picture is a full body picture if the target object in the target object segmentation picture does not include a half body object.

In a second aspect, a picture processing apparatus is provided in the present disclosure. The apparatus includes:

an obtaining module, configured to obtain pictures to be processed, the pictures to be processed including a target object segmentation picture and a background completion picture from a same original picture;

an effect processing module, configured to perform effect processing on the target object segmentation picture and the background completion picture separately, according to a picture type of the target object segmentation picture, to obtain an effect picture corresponding to the target object segmentation picture and an effect picture corresponding to the background completion picture; and a synthesizing module, configured to synthesizing the effect picture corresponding to the target object segmentation picture and the effect picture corresponding to the background completion picture to generate an effect video corresponding to the original picture.

In a third aspect, a computer-readable storage medium is provided in the present disclosure. The computer-readable storage medium stores instructions, and when the instructions are run on a terminal device, the terminal device implements the method according to the first aspect of the present disclosure.

In a fourth aspect, a device is provided in the present disclosure. The device includes: a memory, a processor, and a computer program stored on the memory and capable of running on the processor. When the processor executes the computer program, the method according to the first aspect of the present disclosure is implemented.

Compared with the conventional technology, the technical solution provided by the embodiments of the present disclosure has the following advantages.

The embodiment of the present disclosure provides a picture processing method. First, a target object segmentation picture and a background completion picture from a same original picture are determined as the pictures to be processed. Then, effect processing is performed on the target object segmentation picture and the background completion picture separately, according to a picture type of the target object segmentation picture, to obtain an effect picture corresponding to the target object segmentation picture and an effect picture corresponding to the background completion picture. Finally, the respective effect pictures corresponding to the target object segmentation picture and the background completion picture are synthesized to generate the rotating animation corresponding to the original picture. In the embodiments of the present disclosure, effect processing is performed on the target object segmentation picture and the background completion picture from the same original picture separately, and then the respective effect pictures corresponding to the target object segmentation picture and the background completion picture are synthesized to generate the rotating animation of the original picture. Through the rotating animation, the original picture can be displayed to users in a stereoscopic and dynamic form, meeting the user's requirements for displaying effects of pictures.

BRIEF DESCRIPTION OF THE DRAWINGS

The drawings herein are incorporated into the specification and form a part of the specification, showing embodiments in accordance with the disclosure, and are used together with the specification to explain the principles of the disclosure.

In order to more clearly explain the embodiments of the present disclosure or the technical solutions in the conventional technology, the following will briefly introduce the drawings needed to be used in the embodiments or the conventional technology description. Obviously, for those skilled in the art, other drawings may be obtained from these drawings without any creative labor.

DETAILED DESCRIPTION

In order to better understand the above purposes, features and advantages of the present disclosure, the solution of the present disclosure will be further described below. It should be noted that the embodiments of the present disclosure and the features in the embodiments may be combined with each other without conflict.

Many specific details are described in the following description to facilitate full understanding of the disclosure, and the disclosure may also be implemented in other ways different from those described herein. Obviously, the embodiments in the specification are only a part of the embodiments of the present disclosure, not all of them.

In order to meet the user's requirements for displaying effects of pictures, the present disclosure provides a picture processing method. First, a target object segmentation picture and a background completion picture from a same original picture are determined as the pictures to be processed. Second, effect processing is performed on the target object segmentation picture and the background completion picture separately, according to a picture type of the target object segmentation picture, to obtain an effect picture corresponding to the target object segmentation picture and an effect picture corresponding to the background completion picture. Finally, the respective effect pictures corresponding to the target object segmentation picture and the background completion picture are synthesized to generate the rotating animation corresponding to the original picture. In the embodiments of the present disclosure, through the rotating animation, the original picture can be displayed to users in a stereoscopic and dynamic form, meeting the user's requirements for displaying effects of pictures.

Figure 1:
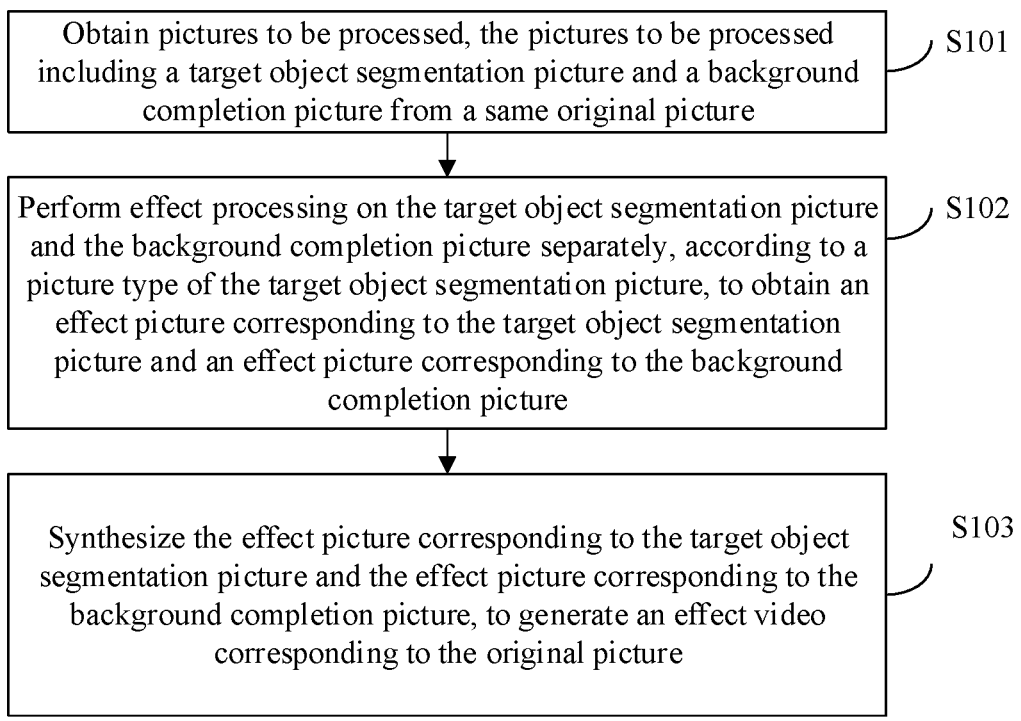
FIG. 1 is a flowchart of a picture processing method according to an embodiment of the present disclosure.

On the basis of the above, the embodiment of the present disclosure provides a picture processing method. Referring to FIG. 1, FIG. 1 is a flowchart of a picture processing method according to an embodiment of the present disclosure. The method includes the following steps.

In step S101, pictures to be processed are obtained, and the pictures to be processed include a target object segmentation picture and a background completion picture from a same original picture.

In the embodiment of the present disclosure, after determining the original picture to be processed, the target object in the original picture is separated from the background to obtain the target picture segmentation picture and the background completion picture corresponding to the original picture. The target picture segmentation picture includes the target object in the original picture, and the background completion picture includes the background in the original picture. The target object may include portraits, animals, plants, etc. Usually, the original picture includes at least one target object.

Specifically, the target object is extracted from the original picture to obtain the target picture segmentation picture corresponding to the original picture. After the target object is extracted and removed from the original picture, the original picture is not complete now. Padding may be performed in the area where the target object is removed to obtain a complete picture as the background completion picture corresponding to the original picture. The padding may be performed in a way of understanding content of the original picture by using a conventional algorithm model and then padding based on the understood content.

In the embodiment of the present disclosure, after obtaining the target object segmentation picture and background completion picture from the same original picture, the target object segmentation picture and background completion picture are determined as the pictures to be processed.

In step S102, effect processing is performed on the target object segmentation picture and the background completion picture separately, according to a picture type of the target object segmentation picture, to obtain an effect picture corresponding to the target object segmentation picture and an effect picture corresponding to the background completion picture.

In the embodiment of the present disclosure, before processing the picture, the picture type of the target object segmentation picture is first identified, and then effect processing is performed on the target object segmentation picture and background completion picture separately with an effect processing scheme corresponding to the picture type of the target object segmentation.

The picture type may include a full body picture and a half body picture. For the full body picture and the half body picture, the embodiments of the present disclosure provide different processing methods based on the characteristics of the full body picture and the half body picture.

For a portrait picture or an animal picture, one of the distinguishing features between the full body picture and the half body picture is that the full body picture usually contains a foot feature, while the half body picture do not contain the foot feature. Therefore, in the embodiment of the present disclosure, the picture type of the target object segmentation picture may be determined by identifying whether the target object segmentation picture contains the foot feature. Specifically, if the target object segmentation picture contains the foot feature, the target object segmentation picture is determined as the full body picture, otherwise it is determined as the half body picture.

In addition, the method for identifying the type of the target object segmentation picture is not limited herein.

In an embodiment of the present disclosure, the target object segmentation picture may include multiple target objects, such as a multi-person picture. Assuming that the multi-person picture includes not only a full body portrait, but also a half body portrait, in order to ensure the display effect of the original picture, the multi-person picture may be determined as the half body picture, and then it may be processed according to the effect processing method for the half body picture.

Specifically, it is determined first whether the target object in the target object segmentation picture includes a half body object. If it is determined that the target object in the target object segmentation picture includes the half body object, the picture type of the target object segmentation picture is determined as the half body picture. Otherwise, the picture type of the target object segmentation picture is determined as the full body picture.

In addition, when the target objects are animals, plants, etc., the features of animals and plants may be learned through Big Data learning, and then the picture type of the target object segmentation picture may be determined based on the learned features, which will not be detailed in the embodiment of the present disclosure.

In the embodiment of the present disclosure, after determining the picture type of the target object segmentation picture, the effect processing method for the target object segmentation picture and background completion picture is determined based on the picture type of the target object segmentation picture. After the corresponding effect processing method is used to process the target object segmentation picture and background completion picture separately, the effect pictures corresponding to the target object segmentation picture and background completion picture are obtained.

In an embodiment of the present disclosure, if it is determined that the target object segmentation picture belongs to the full body picture, the target object segmentation picture is translated and enlarged according to a preset first direction to obtain the effect picture corresponding to the target object segmentation picture. The preset first direction is leftward or rightward. Then, a rotation of the perspective view of the background completion picture is implemented according to a preset second direction to obtain the effect picture corresponding to the background completion picture. The preset second direction is leftward or rightward, and the preset first direction is different from the preset second direction.

That is, the target object segmentation picture may be translated and enlarged rightward, and the background completion picture may be rotated in perspective leftward. Alternatively, the target object segmentation picture may be translated and enlarged leftward, and the background completion picture may be rotated in perspective rightward.

In another embodiment of the present disclosure, if the target object segmentation picture belongs to the half body picture, the target object segmentation picture is enlarged according to a forward direction to obtain the effect picture corresponding to the target object segmentation picture. Then, the perspective view of the background completion picture is rotated in an effect of a front leaning to a preset angle, to obtain the effect picture corresponding to the background completion picture. The preset angle may include any angle from 45 degrees to 90 degrees.

In the above effect processing method, both the background completion picture and the target object segmentation picture are subject to stereoscopic dynamic processing. Therefore, the present disclosure may meet the user's requirements for stereoscopic dynamic display of pictures. In addition, in the embodiment of the present disclosure, the target picture segmentation picture is enlarged, highlighting the target object in the original picture, which can improve the user experience to a certain extent.

In step S103, the effect picture corresponding to the target object segmentation picture and the effect picture corresponding to the background completion picture are synthesized to generate an effect video corresponding to the original picture.

In the embodiment of the present disclosure, after performing effect processing on the target object segmentation picture and the background completion picture separately, the effect pictures corresponding to the target object segmentation picture and the background completion picture are obtained, and then the effect pictures are synthesized to generate the effect video corresponding to the original picture. Through the effect video corresponding to the original picture, the target object in the original picture can be displayed in a stereoscopic and dynamic form, and the user experience can be improved.

In an embodiment of the present disclosure, the effect pictures corresponding to the target object segmentation picture and the background completion picture may be synthesized to generate a rotating animation corresponding to the original picture.

In an embodiment of the present disclosure, in order to ensure the effect of picture processing, after synthesizing the effect pictures corresponding to the target object segmentation picture belonging to the half body picture and the corresponding background completion picture, a connection point between the target object in the effect picture corresponding to the target object segmentation picture and the effect picture corresponding to the background completion picture is determined first. Then, based on the connection point, the effect pictures corresponding to the target object segmentation picture and the background completion picture are synthesized to generate the rotating animation corresponding to the original picture, so that there is a connection point between the target object and the background completion picture in the synthesized rotating animation to ensure the display effects of pictures.

In the picture processing method according to the embodiments of the present disclosure, first, the target object segmentation picture and background completion picture from the same original picture are determined as the picture to be processed. Then, the picture type of the target object segmentation picture is identified, effect processing is performed on the target object segmentation picture and the background completion picture separately on the basis of the picture type of the target object segmentation picture, to obtain an effect picture corresponding to the target object segmentation picture and an effect picture corresponding to the background completion picture. Finally, the effect pictures corresponding to the target object segmentation picture and the background completion picture are synthesized to generate the rotating animation of the original picture. In the embodiments of the present disclosure, through the rotating animation, the original picture can be displayed to users in a stereoscopic and dynamic form, meeting the user's requirements for displaying effects of pictures.

In an application scenario, the original picture may include multiple portrait pictures. In the picture processing method according to the embodiment of the present disclosure, the corresponding effect video may be obtained for each portrait picture, and then the effect videos corresponding to multiple portrait pictures are composed into an album.

In practical applications, multiple pictures may be displayed at the same time in stereoscopic and dynamic form when playing the album, meeting the effect requirements of users to convert pictures into videos for stereoscopic and dynamic display, and improving the user experience.

Figure 2:
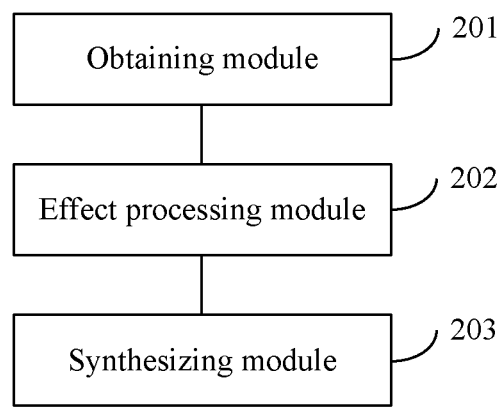
FIG. 2 is a block diagram of a picture processing apparatus according to an embodiment of the present disclosure.

Corresponding to the embodiments of the above method, a picture processing apparatus is further provided according to embodiments of the present disclosure. Referring to FIG. 2, FIG. 2 is a block diagram of a picture processing apparatus according to an embodiment of the present disclosure. The apparatus includes an obtaining module 201, an effect processing module 202 and a synthesizing module 203.

The obtaining module 201 is configured to obtain pictures to be processed, and the pictures to be processed include a target object segmentation picture and a background completion picture from a same original picture.

The effect processing module 202 is configured to perform effect processing on the target object segmentation picture and the background completion picture separately, according to a picture type of the target object segmentation picture, to obtain an effect picture corresponding to the target object segmentation picture and an effect picture corresponding to the background completion picture.

The synthesizing module 203 is configured to synthesizing the effect picture corresponding to the target object segmentation picture and the effect picture corresponding to the background completion picture to generate an effect video corresponding to the original picture.

In an embodiment of the present disclosure, the effect processing module 202 includes a first processing submodule and a second processing submodule.

The first processing submodule is configured to, if the picture type of the target object segmentation picture is a full body picture, translate and enlarge the target object segmentation picture according to a preset first direction to obtain the effect picture corresponding to the target object segmentation picture. The preset first direction is rightward or leftward.

The second processing submodule is configured to rotate a perspective view of the background completion picture according to a preset second direction to obtain the effect picture corresponding to the background completion picture. The preset second direction is leftward or rightward, and the preset first direction is different from the preset second direction.

In an embodiment of the present disclosure, the effect processing module 202 includes a third processing submodule and a fourth processing submodule.

The third processing submodule is configured to, if the picture type of the target object segmentation picture is a half body picture, enlarge the target object segmentation picture according to a forward direction to obtain the effect picture corresponding to the target object segmentation picture.

The fourth processing submodule is configured to rotate a perspective view of the background completion picture for an effect of a front leaning to a preset angle, to obtain the effect picture corresponding to the background completion picture.

In an embodiment of the present disclosure, the synthesizing module 203 is configured to synthesizing the effect picture corresponding to the target object segmentation picture and the effect picture corresponding to the background completion picture to generate a rotating animation corresponding to the original picture.

In an embodiment of the present disclosure, the synthesizing module 203 includes a first determination submodule and a synthesizing submodule.

The first determination submodule is configured to, if the picture type of the target object segmentation picture is the half body picture, determine a connection point between a target object in the effect picture corresponding to the target object segmentation picture and the effect picture corresponding to the background completion picture.

The synthesizing submodule is configured to synthesize the effect picture corresponding to the target object segmentation picture and the effect picture corresponding to the background completion picture to generate a rotating animation corresponding to the original picture based on the connection point.

In an embodiment of the present disclosure, the target object segmentation picture includes a portrait segmentation picture.

In an embodiment of the present disclosure, the apparatus further includes a video synthesizing module, and the video synthesizing module is configured to generate an album from effect videos corresponding to a plurality of original pictures.

In an embodiment of the present disclosure, the apparatus further includes a first determination module, a second determination module and a third determination module.

The first determination module is configured to determine whether a target object in the target object segmentation picture includes a half body object.

The second determination module is configured to determine that the picture type of the target object segmentation picture is a half body picture if the result of the first determination module is positive.

The third determination module is configured to determine that the picture type of the target object segmentation picture is a full body picture if the result of the first determination module is negative.

In the picture processing apparatus according to embodiments of the present disclosure, first, it is determined that the target object segmentation picture and the background completion picture from the same original picture are the pictures to be processed. Then, effect processing is performed on the target object segmentation picture and the background completion picture separately, according to a picture type of the target object segmentation picture, to obtain an effect picture corresponding to the target object segmentation picture and an effect picture corresponding to the background completion picture. Finally, the respective effect pictures corresponding to the target object segmentation picture and the background completion picture are synthesized to generate the rotating animation corresponding to the original picture. In the embodiments of the present disclosure, through the rotating animation, the original picture can be displayed to users in a more stereoscopic and dynamic form, meeting the user's requirements for displaying effects of pictures.

Figure 3:
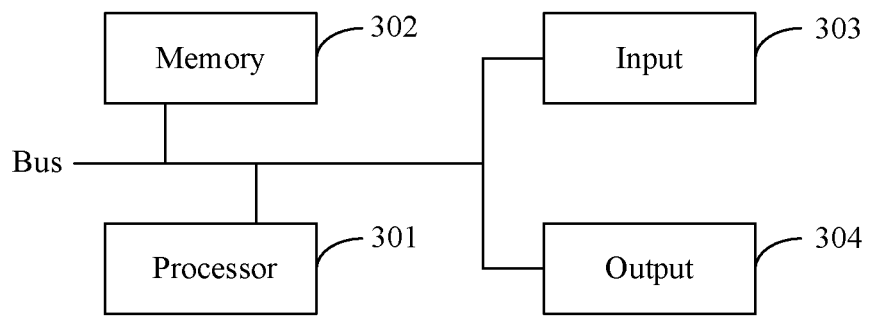
FIG. 3 is a block diagram of a picture processing device according to an embodiment of the present disclosure.

In addition, a picture processing device is provided according to an embodiment of the present disclosure, as shown in FIG. 3.

The picture processing device may include a processor 301, a memory 302, an input apparatus 303, and an output apparatus 304.

The number of processors 301 in the picture processing device may be one or more, and one processor is taken as an example in FIG. 3. In some embodiments of the present disclosure, the processor 301, the memory 302, the input apparatus 303 and the output apparatus 304 may be connected through a bus or other means, and the connection through the bus is taken as an example in FIG. 3.

The memory 302 may be used to store software programs and modules, and the processor 301 executes various functional applications of the picture processing device and data processing by running software programs and modules stored in the memory 302. The memory 302 may mainly include a storage program area and a storage data area, and the storage program area may store an operating system, an application program required for at least one function, and the like. In addition, the memory 302 may include high-speed random access memory, and may also include non-volatile memory, such as at least one disk storage device, flash memory device, or other volatile solid-state storage devices. The input apparatus 303 may be operable to receive input digital or character information and generate signal inputs related to user settings and functional control of the picture processing apparatus.

Specifically, in the embodiment, the processor 301 will load the executable files corresponding to the processes of one or more application programs into the memory 302 according to the following instructions, and the processor 301 will run the applications stored in the memory 302, thus realizing various functions of the above chip processing device.

It should be noted that, in the present disclosure, relational terms such as "first" and "second" are only used to distinguish one entity or operation from another entity or operation, and do not necessarily require or imply any such actual relationship or order between these entities or operations. Moreover, the terms "comprising", "including" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without further restrictions, the elements defined by the statement "including one . . . " do not exclude that there are other identical elements in the process, method, article or equipment including the elements.

The above is only specific embodiments of the present disclosure, enabling those skilled in the art to understand or realize the present disclosure. A variety of modifications to these embodiments will be apparent to those skilled in the art. The general principles defined herein may be implemented in other embodiments without departing from the spirit or scope of the disclosure. Therefore, the present disclosure will not be limited to these embodiments described herein, but will conform to the widest scope consistent with the principles and novel features disclosed herein.

The invention claimed is:

1. A picture processing method, comprising:
obtaining pictures to be processed, the pictures to be processed comprising a target object segmentation picture and a background completion picture from a same original picture;
performing effect processing on the target object segmentation picture and the background completion picture separately, according to a picture type of the target object segmentation picture, to obtain an effect picture corresponding to the target object segmentation picture and an effect picture corresponding to the background completion picture, comprising:

identifying the picture type of the target object segmentation picture, determining an effect processing scheme corresponding to the identified picture type of the target object segmentation picture, wherein the picture type of the target object segmentation picture is a full body picture or a half body picture, and wherein the full body picture and the half body picture correspond to effect processing schemes different from each other, and performing the effect processing on the target object segmentation picture and the background completion picture separately with the determined effect processing scheme;

synthesizing the effect picture corresponding to the target object segmentation picture and the effect picture corresponding to the background completion picture to generate an effect video corresponding to the original picture; and generating an album from the plurality of effect videos corresponding to the plurality of the original pictures.

2. The method according to claim 1, wherein the performing effect processing on the target object segmentation picture and the background completion picture separately, according to a picture type of the target object segmentation picture, to obtain an effect picture corresponding to the target object segmentation picture and an effect picture corresponding to the background completion picture comprises:

if the picture type of the target object segmentation picture is the full body picture, translating and enlarging the target object segmentation picture according to a preset first direction to obtain the effect picture corresponding to the target object segmentation picture, the preset first direction being rightward or leftward; and rotating a perspective view of the background completion picture according to a preset second direction to obtain the effect picture corresponding to the background completion picture, the preset second direction being leftward or rightward, and the preset first direction being different from the preset second direction.

3. The method according to claim 2, wherein the synthesizing the effect picture corresponding to the target object segmentation picture and the effect picture corresponding to the background completion picture to generate the effect video corresponding to the original picture comprises:

synthesizing the effect picture corresponding to the target object segmentation picture and the effect picture corresponding to the background completion picture to generate a rotating animation corresponding to the original picture.

4. The method according to claim 3, wherein the synthesizing the effect picture corresponding to the target object segmentation picture and the effect picture corresponding to the background completion picture to generate the rotating animation corresponding to the original picture comprises:

if the picture type of the target object segmentation picture is the half body picture, determining a connection point between a target object in the effect picture corresponding to the target object segmentation picture and the effect picture corresponding to the background completion picture; and synthesizing the effect picture corresponding to the target object segmentation picture and the effect picture corresponding to the background completion picture to generate the rotating animation corresponding to the original picture based on the connection point.

5. The method according to claim 1, wherein the performing effect processing on the target object segmentation picture and the background completion picture separately, according to a picture type of the target object segmentation picture, to obtain an effect picture corresponding to the target object segmentation picture and an effect picture corresponding to the background completion picture comprises:

if the picture type of the target object segmentation picture is the half body picture, enlarging the target object segmentation picture according to a forward direction to obtain the effect picture corresponding to the target object segmentation picture; and rotating a perspective view of the background completion picture for an effect of a front leaning to a preset angle, to obtain the effect picture corresponding to the background completion picture.

6. The method according to claim 1, wherein the target object segmentation picture comprises a portrait segmentation picture.

7. The method according to claim 1, wherein before the performing effect processing on the target object segmentation picture and the background completion picture separately, according to a picture type of the target object segmentation picture, to obtain an effect picture corresponding to the target object segmentation picture and an effect picture corresponding to the background completion picture, the method further comprises:

determining whether a target object in the target object segmentation picture comprises a half body object;

determining that the picture type of the target object segmentation picture is the half body picture if the target object in the target object segmentation picture comprises a half body object; and determining that the picture type of the target object segmentation picture is the full body picture if the target object in the target object segmentation picture does not comprise a half body object.

8. The method according to claim 1, further comprising:

extracting a target object from the original picture to obtain the target picture segmentation picture;

understanding content of the original picture; and performing padding, based on the content of the original picture, in an area of the original picture where the target object is removed, to obtain a complete picture as the background completion picture.

9. A non-transitory computer-readable storage medium having instructions stored thereon, wherein the instructions, when being executed on a terminal device, cause the terminal device to implement:

obtaining pictures to be processed, the pictures to be processed comprising a target object segmentation picture and a background completion picture from a same original picture;

performing effect processing on the target object segmentation picture and the background completion picture separately, according to a picture type of the target object segmentation picture, to obtain an effect picture corresponding to the target object segmentation picture and an effect picture corresponding to the background completion picture, comprising:

identifying the picture type of the target object segmentation picture, determining an effect processing scheme corresponding to the identified picture type of the target object segmentation picture, wherein the picture type of the target object segmentation picture is a full body picture or a half body picture, and wherein the full body picture and the half body picture correspond to effect processing schemes different from each other, and performing the effect processing on the target object segmentation picture and the background completion picture separately with the determined effect processing scheme;

synthesizing the effect picture corresponding to the target object segmentation picture and the effect picture corresponding to the background completion picture to generate an effect video corresponding to the original picture; and generating an album from the plurality of effect videos corresponding to the plurality of the original pictures.

10. A device, comprising:
a memory;
a processor, and
a computer program stored on the memory and executable on the processor;
wherein the processor is configured to, when executing the computer program, implement:
obtaining pictures to be processed, the pictures to be processed comprising a target object segmentation picture and a background completion picture from a same original picture;
performing effect processing on the target object segmentation picture and the background completion picture separately, according to a picture type of the target object segmentation picture, to obtain an effect picture corresponding to the target object segmentation picture and an effect picture corresponding to the background completion picture, comprising:
identifying the picture type of the target object segmentation picture,
determining an effect processing scheme corresponding to the identified picture type of the target object segmentation picture, wherein the picture type of the target object segmentation picture is a full body picture or a half body picture, and wherein the full body picture and the half body picture correspond to effect processing schemes different from each other, and
performing the effect processing on the target object segmentation picture and the background completion picture separately with the determined effect processing scheme;
synthesizing the effect picture corresponding to the target object segmentation picture and the effect picture corresponding to the background completion picture to generate an effect video corresponding to the original picture; and
generating an album from the plurality of effect videos corresponding to the plurality of the original pictures.

11. The device according to claim 10, wherein the processor, when executing the computer program, is further configured to implement:
if the picture type of the target object segmentation picture is the full body picture,
translating and enlarging the target object segmentation picture according to a preset first direction to obtain the effect picture corresponding to the target object segmentation picture, the preset first direction being rightward or leftward; and
rotating a perspective view of the background completion picture according to a preset second direction to obtain the effect picture corresponding to the background completion picture, the preset second direction being leftward or rightward, and the preset first direction being different from the preset second direction.

12. The device according to claim 11, wherein the processor, when executing the computer program, is further configured to implement:
synthesizing the effect picture corresponding to the target object segmentation picture and the effect picture corresponding to the background completion picture to generate a rotating animation corresponding to the original picture.

13. The device according to claim 10, wherein the processor, when executing the computer program, is further configured to implement:
if the picture type of the target object segmentation picture is the half body picture, enlarging the target object segmentation picture according to a forward direction to obtain the effect picture corresponding to the target object segmentation picture; and
rotating a perspective view of the background completion picture for an effect of a front leaning to a preset angle, to obtain the effect picture corresponding to the background completion picture.

14. The device according to claim 13, wherein the processor, when executing the computer program, is further configured to implement:
synthesizing the effect picture corresponding to the target object segmentation picture and the effect picture corresponding to the background completion picture to generate a rotating animation corresponding to the original picture.

15. The device according to claim 14, wherein the processor, when executing the computer program, is further configured to implement:
if the picture type of the target object segmentation picture is the half body picture,
determining a connection point between a target object in the effect picture corresponding to the target object segmentation picture and the effect picture corresponding to the background completion picture; and
synthesizing the effect picture corresponding to the target object segmentation picture and the effect picture corresponding to the background completion picture to generate the rotating animation corresponding to the original picture based on the connection point.

16. The device according to claim 10, wherein the target object segmentation picture comprises a portrait segmentation picture.

17. The device according to claim 10, wherein the processor, when executing the computer program, is further configured to implement:
the target object segmentation picture comprises a portrait segmentation picture.

18. The device according to claim 10, wherein the processor, when executing the computer program, is further configured to implement:
determining whether a target object in the target object segmentation picture comprises a half body object;
determining that the picture type of the target object segmentation picture is the half body picture if the target object in the target object segmentation picture comprises a half body object; and
determining that the picture type of the target object segmentation picture is the full body picture if the target object in the target object segmentation picture does not comprise a half body object.

19. The device according to claim 10, wherein the processor, when executing the computer program, is further configured to implement:
- extracting a target object from the original picture to obtain the target picture segmentation picture;
- understanding content of the original picture; and
- performing padding, based on the content of the original picture, in an area of the original picture where the target object is removed, to obtain a complete picture as the background completion picture.

* * * * *